(12) United States Patent
    Clinton et al.

(10) Patent No.: US 12,636,827 B2
(45) Date of Patent: May 26, 2026

(54) STEREOLITHOGRAPHY APPARATUS FOR IMPROVING PLANARITY OF A TRANSPARENT SHEET

(71) Applicant: 3D Systems, Inc., Rock Hill, SC (US)

(72) Inventors: Nickolas M. Clinton, Carlsbad, CA (US); Charles W. Hull, Santa Clarita, CA (US); Grant Draper, Escondido, CA (US); David Sabo, San Diego, CA (US); Samuel David Rohrbach, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 130 days.

(21) Appl. No.: 18/753,118

(22) Filed: Jun. 25, 2024

(65) Prior Publication Data

US 2025/0001676 A1 Jan. 2, 2025

Related U.S. Application Data

(60) Provisional application No. 63/620,328, filed on Jan. 12, 2024, provisional application No. 63/510,962, filed on Jun. 29, 2023.

(51) Int. Cl.
    *B29C 64/124* (2017.01)
    *B29C 64/218* (2017.01)
    (Continued)

(52) U.S. Cl.
    CPC .......... *B29C 64/124* (2017.08); *B29C 64/218* (2017.08); *B29C 64/236* (2017.08);
    (Continued)

(58) Field of Classification Search
    CPC .... B29C 64/124; B29C 64/129; B29C 64/135
    See application file for complete search history.

(56) References Cited

U.S. PATENT DOCUMENTS 5,171,490 A 12/1992 Fudim
5,306,446 A 4/1994 Howe
(Continued)

OTHER PUBLICATIONS

PCT International Search Report for International Search Authority for PCT/US2024/035344 mailed Sep. 18, 2024 (6 pages).
(Continued)

*Primary Examiner* — Atul P. Khare

(57) ABSTRACT

A 3D printing system includes a build vessel, a carriage, and a light engine. The build vessel includes a vessel base having a downward extending tension ring that tensions a transparent sheet. The transparent sheet laterally bounds a build plane that is defined over orthogonal lateral axis X and Y. The carriage includes a roller that extends between two opposing sides of the tension ring. The roller exerts an upward force on the transparent sheet and the two opposing sides of the tension ring. The vertical constraint of the roller biased against the tension ring provides a location and improved planarity of a supported portion of the transparent sheet adjacent to the roller. The light engine light engine is configured to selectively apply radiation to a projected area of the build plane through the supported portion of the transparent sheet.

22 Claims, 10 Drawing Sheets

(51) Int. Cl.

| | |
|---|---|
| *B29C 64/236* | (2017.01) |
| *B29C 64/245* | (2017.01) |
| *B29C 64/255* | (2017.01) |
| *B33Y 10/00* | (2015.01) |
| *B33Y 30/00* | (2015.01) |
| *B33Y 80/00* | (2015.01) |
| *B29K 105/00* | (2006.01) |

(52) U.S. Cl.

CPC .......... *B29C 64/245* (2017.08); *B29C 64/255* (2017.08); *B33Y 10/00* (2014.12); *B33Y 30/00* (2014.12); *B33Y 80/00* (2014.12); *B29K 2105/256* (2013.01); *B29K 2995/0026* (2013.01)

(56) References Cited

U.S. PATENT DOCUMENTS

| | | | |
|---|---|---|---|
| 7,195,472 | B2 | 3/2007 | Hendrik |
| 7,438,846 | B2 | 10/2008 | Hendrik |
| 7,845,930 | B2 | 12/2010 | Shkolnik et al. |
| 8,777,602 | B2 | 7/2014 | Vermeer et al. |
| 9,375,881 | B2 * | 6/2016 | Elsey ................. B29C 35/0888 |
| 9,981,425 | B2 * | 5/2018 | El-Siblani ............. B29C 64/264 |
| 10,675,856 | B2 * | 6/2020 | FrantzDale ............ B33Y 30/00 |
| 11,059,219 | B2 | 7/2021 | Childers |
| 11,141,911 | B2 * | 10/2021 | Turner ...................... B41J 2/45 |
| 11,167,491 | B2 | 11/2021 | Frantzdale et al. |
| 11,179,882 | B2 * | 11/2021 | Stadlmann .............. B29C 64/20 |
| 11,305,483 | B2 | 4/2022 | Goldman |
| 11,318,672 | B2 | 5/2022 | Elsey |
| 11,318,673 | B2 | 5/2022 | Oikonomopoulos et al. |
| 11,390,027 | B2 | 7/2022 | Lobovsky et al. |
| 11,396,133 | B2 * | 7/2022 | Megretski ............. B29C 64/223 |
| 11,491,712 | B2 | 11/2022 | Turner et al. |
| 11,820,074 | B2 * | 11/2023 | Goldman .............. B29C 64/245 |
| 12,233,600 | B2 * | 2/2025 | Megretski .............. B33Y 40/00 |
| 2005/0248061 | A1 | 11/2005 | Shkolnik et al. |
| 2010/0227068 | A1 * | 9/2010 | Boot .................... B29C 64/135 |
| | | | 118/56 |
| 2019/0152135 | A1 | 5/2019 | Goldman |
| 2019/0366623 | A1 | 12/2019 | Shane et al. |
| 2019/0369566 | A1 | 12/2019 | Lobovsky et al. |
| 2021/0299952 | A1 | 9/2021 | Xia et al. |

OTHER PUBLICATIONS

PCT International Written Opinion for International Search Authority for PCT/US2024/035344 mailed Sep. 18, 2024 (5 pages).

* cited by examiner

STEREOLITHOGRAPHY APPARATUS FOR IMPROVING PLANARITY OF A TRANSPARENT SHEET

CROSS REFERENCE TO RELATED APPLICATIONS

This non-provisional patent application claims priority to U.S. Provisional Application Ser. No. 63/510,962, Entitled "Stereolithography Apparatus for Improving Planarity of a Transparent Sheet" by Charles W. Hull et al., filed on Jun. 29, 2023, incorporated herein by reference under the benefit of U.S.C. 119(e). This non-provisional patent application also claims priority to U.S. Provisional Application Ser. No. 63/620,328, Entitled "Stereolithography Apparatus for Improving Planarity of a Transparent Sheet" by Nickolas M. Clinton et al., filed on Jan. 12, 2024, incorporated herein by reference under the benefit of U.S.C. 119(e).

FIELD OF THE INVENTION

The present disclosure concerns an apparatus and method for manufacture of solid three dimensional (3D) articles from radiation curable materials in a layer-by-layer manner. More particularly, the present disclosure concerns an improved mechanism for obtaining high resolution 3D articles by controlling flatness of a transparent sheet which forms part of an optical path.

BACKGROUND

Three dimensional (3D) printers are in rapidly increasing use for manufacturing customized 3D articles. One class of 3D printers includes stereolithography printers having a general principle of operation including the selective curing and hardening of radiation curable (i.e., photocurable) liquids. One type of stereolithography system includes a containment vessel holding the photocurable liquid, a movement mechanism coupled to a support tray, and a light engine. The stereolithography system manufactures or fabricates a 3D article by selectively curing layers of the photocurable liquid along a build plane above a transparent sheet. There is a desire to produce articles having features sizes that are 10 microns or smaller in size. One challenge is the weight of a column of photocurable liquid distorting the transparent sheet which in turn impacts dimensional accuracy of a 3D article. Another challenge is an ability to create a thin layer of photocurable liquid to enable the small feature sizes.

SUMMARY

In an aspect of the disclosure a three-dimensional (3D) printing system is configured to manufacture or fabricate a 3D article. The 3D printing system includes a machine chassis including a vessel support, a build vessel, a carriage, and a light engine. The build vessel is supported by the vessel support. The build vessel includes a vessel base having a downward extending tension ring and a transparent sheet that is tensioned over the tension ring. The transparent sheet laterally bounds a build plane that is defined over orthogonal lateral axis X and Y. The carriage includes a roller that extends between two opposing sides of the tension ring. The roller exerts an upward force on the transparent sheet and the two opposing sides of the tension ring. The upward force of the roller against the tension ring—with the transparent sheet therebetween—constrains a vertical location and improves planarity of a supported portion of the transparent sheet adjacent to the roller. The light engine is configured to selectively apply radiation to a projected area of the build plane through the supported portion of the transparent sheet.

In one implementation the vessel base includes a recess that extends around the tension ring. A support frame clamps a peripheral edge of the transparent sheet. The support frame is mounted within the recess. The transparent sheet extends downward from the support frame, over a lower edge of the tension ring, and laterally between opposing sides of the tension ring. The transparent sheet provides a lower bound for photocurable liquid that is disposed within the build vessel.

In another implementation the carriage is slidingly mounted to the vessel base by a pair of linear bearings to constrain motion of the carriage along the lateral axis X. The carriage includes a lateral movement mechanism configured to translate and position the carriage along the lateral axis X. The roller extends along the lateral axis Y. The light engine generates a pixelated radiation field that is configured to translate and be positioned with the carriage along the lateral axis X. The pixelated radiation field of the light engine is configured to translate and be positioned along the lateral axis Y.

In yet another implementation the roller is individually coupled to the carriage at two ends by a pair of circular bearings. The circular bearings are biased upward to provide the upward force of the roller upon the transparent sheet and the tension ring. In a further implementation, the 3D printing system includes a lateral movement mechanism coupled to the carriage and the light engine and configured to: (1) position the carriage and light engine together along the lateral axis X and (2) position and translate the light engine relative to the carriage along the lateral axis Y. The 3D printing system includes a controller configured to: (A) operate the vertical movement mechanism to position a lower face of the build plate or the 3D article in a partially fabricated state at the build plane, and (B) operate the lateral movement mechanism to position the carriage at a plurality of locations along the lateral axis X, at an individual one of the plurality of adjacent locations the rollers bound a column of the build plane so that the plurality of adjacent locations correspond to a plurality of adjacent columns, the adjacent columns contiguously cover a region of the build plane to be selectively irradiated, at a column: (a) operate the lateral movement mechanism to scan the light engine over the column along the lateral axis Y, and (b) operate the light engine to selectively irradiate the column.

In a further implementation, the roller includes two rollers. The supported portion of the transparent sheet is between the two rollers. The light engine is configured to translate relative to the carriage along the lateral axis Y between the two rollers.

In a yet further implementation, the system includes a source of pressurized gas configured to apply fluid pressure to a lower surface of the transparent sheet. The fluid pressure applied by the pressurized gas is equal to or less than a fluid column pressure exerted by a column of photocurable liquid within the build vessel. The gas pressure in combination with a single or double roller provides yet improved planarity and vertical positional accuracy of the supported portion of the transparent sheet.

DETAILED DESCRIPTION OF THE PREFERRED EMBODIMENT

Figure 1:
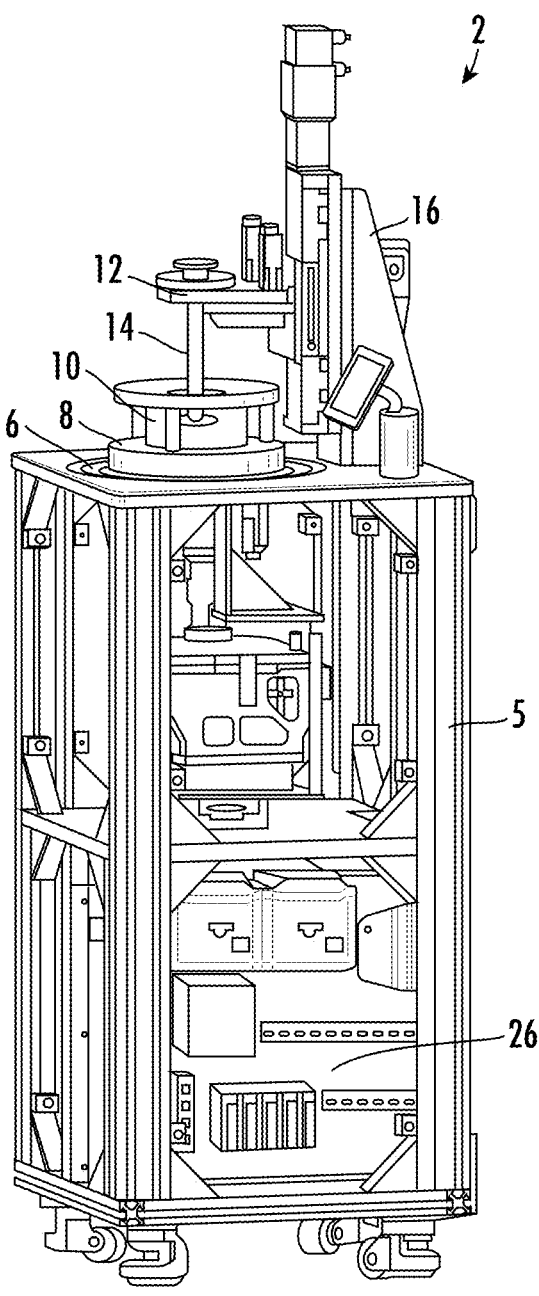
FIG. 1 is an isometric drawing depicting an embodiment of a three-dimensional (3D) printing system for manufacturing a 3D article.

FIG. 1 is an isometric drawing of an embodiment of a three-dimensional (3D) printing system 2 for manufacturing or fabricating a 3D article 4 (FIG. 2) with an outer housing removed to illustrate internal components. In describing 3D system 2, mutually perpendicular axes X, Y, and Z will be used. Axes X and Y are generally horizontal lateral axes. Axis Z is a vertical axis that is generally aligned with a gravitational reference. In using the word "generally" it is implied that a limitation that is "generally" true is by design and to within manufacturing tolerances. Additionally angular axes theta-X, theta-Y, and theta-Z are rotations about the X, Y, and Z axes respectively.

3D printing system 2 includes a chassis or frame 5 having a vessel support 6. A build vessel 8 configured to contain a photocurable liquid 10 is supported by the vessel support 6. A build platform 14 is supported by an elevator 12. A vertical movement mechanism 16 is configured to vertically position the elevator 12.

An embodiment of vertical movement mechanism 16 includes a motorized ball bearing screw mechanism or otherwise referred to as a ball screw mechanism. A ball screw mechanism includes a vertical screw shaft that passes through a ball nut. The ball nut contains recirculating steel balls and translates vertically in response to rotation of the vertical screw shaft. The vertical screw shaft has helical channels that engage the recirculating balls. The elevator 12 includes the ball nut. A motor is coupled to the vertical screw shaft and is configured to selectively rotate the vertical screw shaft. As the vertical screw shaft rotates, the action of the vertical screw shaft upon the ball nut translates the elevator upward and downward depending on a direction of rotation. Such translation mechanisms are known in the art for precision positioning along vertical, horizontal, and oblique axes. Alternative embodiments of vertical movement mechanisms can include a lead screw and nut system or a rack and pinion mechanism or a motorized belt/pulley system. All such movement mechanisms known in the art for linearly translating components along various axes. All references to movement mechanisms described herein can utilize one or more of these known methods.

Figure 2:
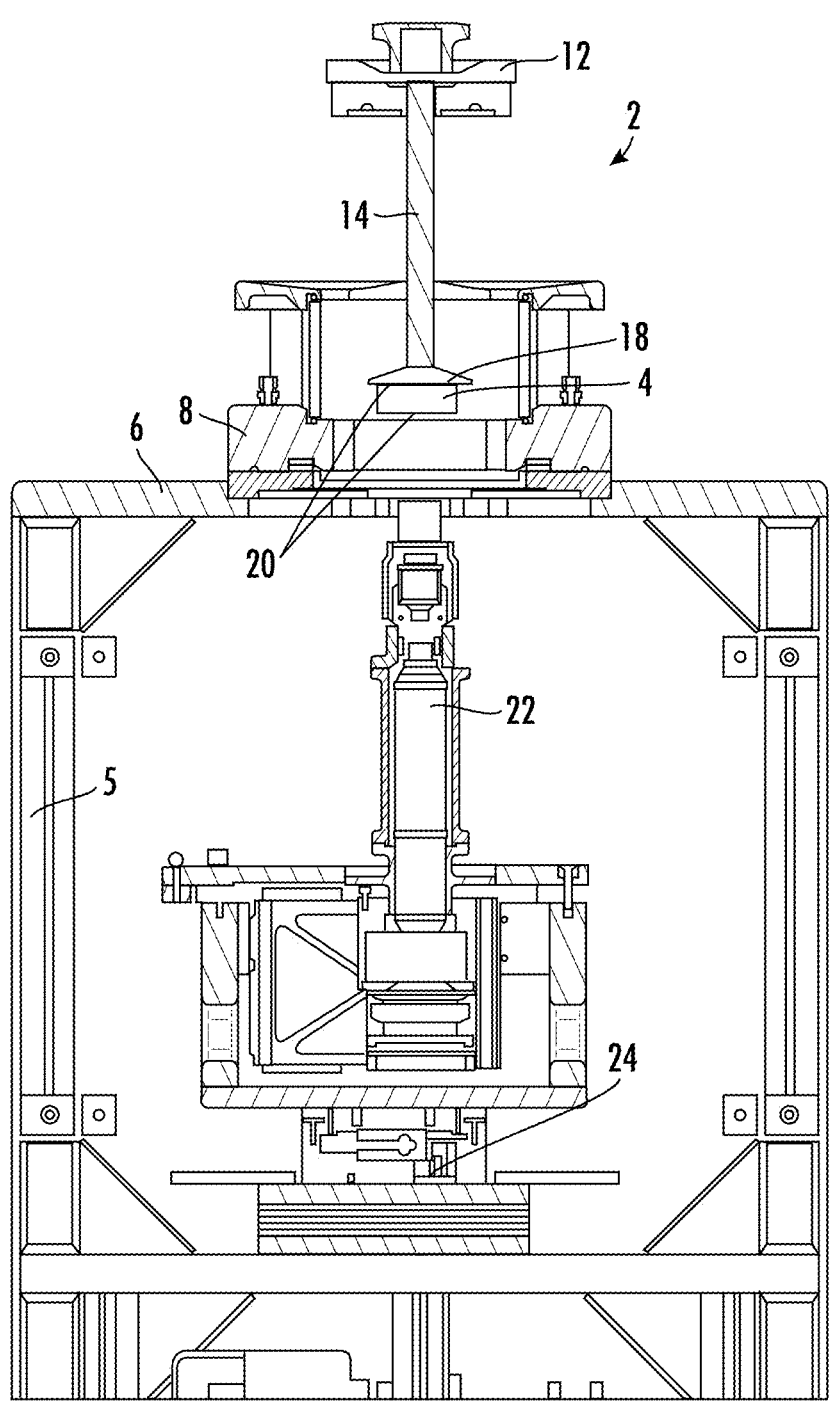
FIG. 2 is a side cutaway view of an embodiment of a three-dimensional (3D) printing system.

FIG. 2 is a side cutaway view of 3D printing system 2. Build platform 14 includes a build plate 18 having a lower surface or face 20 for supporting the 3D article 4 being fabricated. Hereafter element number 20 will refer to a lower face 20 of the build plate 18 or of a partially fabricated 3D article 4. A projection light engine or projector 22 is supported on a lateral movement mechanism 24.

Lateral movement mechanism 24 is configured to translate and position projector 22 along lateral axes X and Y. Lateral movement mechanism 24 can also be referred to as an "XY stage" for some embodiments. In an illustrative embodiment, the lateral movement mechanism 24 includes a vertically stacked arrangement of two linear or stepper motors operating at right angles to each other including an "X motor" and a "Y motor". The motors can act directly or indirectly on the stage to actuate translation of the stage along the X and Y axes. In one embodiment, the motors individually drive a lead screw threaded through a nut. The nut translates linearly in response to motor rotation. This action is similar to that described with respect to the vertical movement mechanism 16. Alternatively, the motors can drive a gear mechanism known as a "gear train". The gear train is a gear reduction mechanism to enable precision movement. Stacks of motorized X and Y stages are known in the art for precision movement along various axes for printers, 3D printers, robotics, inspection systems, and other devices requiring precision movement.

While FIG. 2 illustrates a single projector 22, the light engine 22 can include a plurality of projectors 22. In one embodiment, the light engine 22 includes a row of three projectors 22 arranged along the X or Y axis. In an illustrative embodiment, the plurality of projectors 22 are in a fixed lateral position with respect to each other such that the lateral movement mechanism 24 moves the plurality of projectors 22 in tandem.

Referring back to FIG. 1, the 3D printing system 2 includes a controller 26. Controller 26 is configured to operate the vertical movement mechanism 16, the projector 22, the lateral movement mechanism 24, and other portions of system 2. Also, controller 26 is configured to receive information from sensors and feedback devices within chassis 5. In the illustrated embodiment, controller 26 is within chassis 5. However, it is to be understood that controller 26 can also include computer devices external or remote to the chassis 26. Thus controller 26 can include one or more of a microcontroller, a desktop computer, a laptop computer, a mainframe computer, and a server or shared computing devices.

Figures 3, 4:
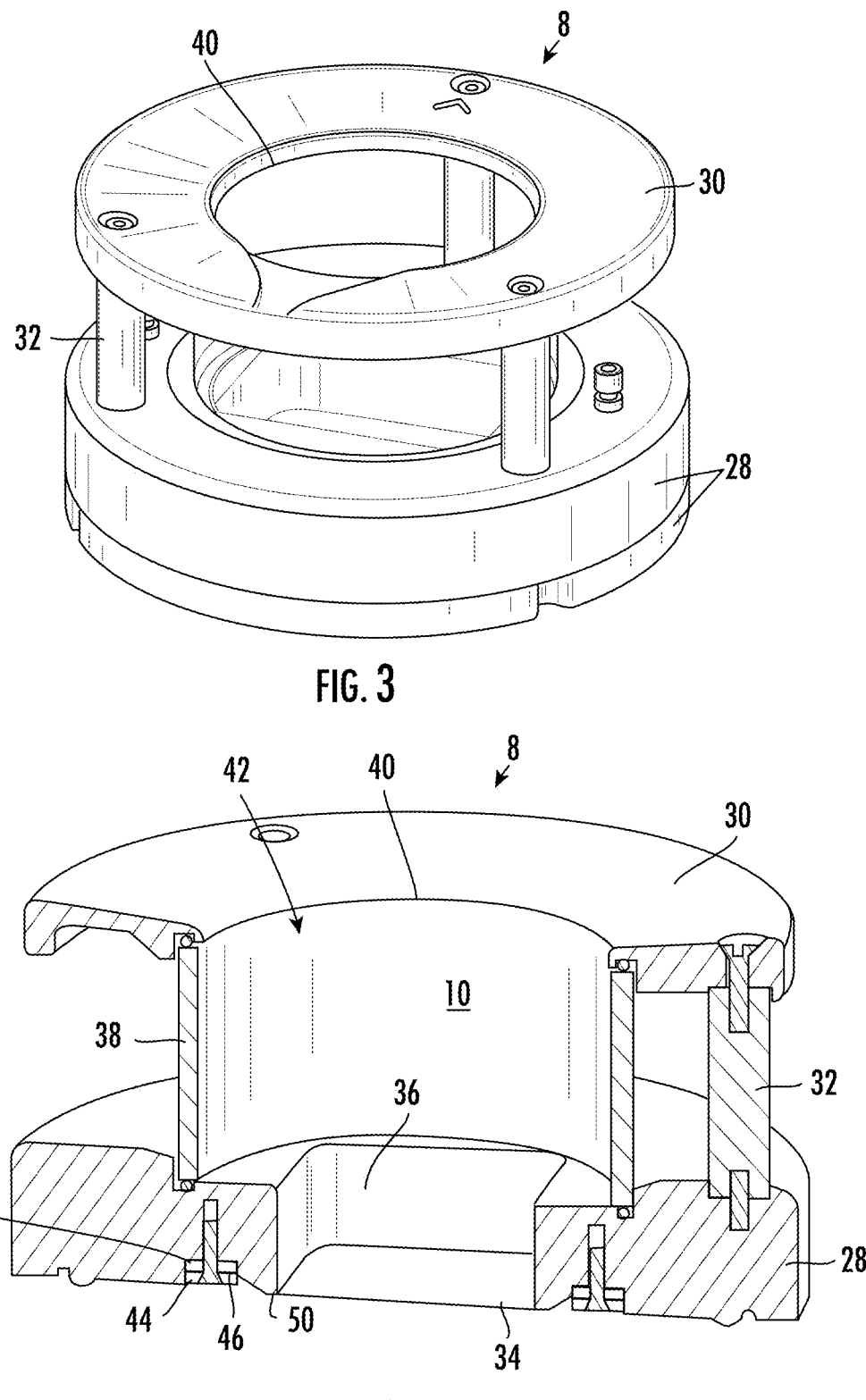
FIG. 3 is an isometric drawing of a build vessel in isolation.
FIG. 4 is a cutaway isometric view of a build vessel in isolation.

FIG. 3 is an isometric view of the build vessel 8 in isolation. Build vessel 8 includes a vessel base 28 coupled to a top 30 by dowels 32. When build vessel 8 is installed in 3D printing system 2, the vessel base 28 aligns to the vessel support 6.

FIG. 4 is a cutaway isometric view of an upper portion of build vessel 8. A transparent sheet 34 closes an opening 36 in the vessel base 28. A wall 38 extends vertically between the vessel base 28 and an opening 40 in the top 30 of the build vessel 8. The vessel base 28, transparent sheet 34, and wall 38 provide a vessel 42 for containing the photocurable liquid 10.

In an illustrative embodiment, the transparent sheet 34 is a polymer sheet that is transparent to radiation in the blue to ultraviolet (UV) range or about 100 to 500 nanometers (nm). The polymer can be an amorphous polymer known in the art to provide optical clarity, low refractive index, and other properties desirable for this application. The polymer is also diffusively transmissive to oxygen which provides an inhibitor to prevent buildup of hardened photocurable material on the transparent sheet 34. Other polymers can also be used if they have a similar set of properties.

The photocurable liquid 10 can a photocurable "bio-ink" or a photocurable resin. The photocurable liquid 10 generally contains, inter alia, a monomer and a catalyst. In response to blue to UV radiation, the catalyst causes the monomer to polymerize or cross-link and solidify. Various photocurable bio-inks and resins are known in the art of stereolithography.

In the illustrated embodiment, the projector 22 is a projection-based light engine. The projector 22 includes a light source, a spatial light modulator, and projection optics. The light source illuminates the spatial light modulator with electromagnetic radiation having a wavelength in a blue to ultraviolet range. The spatial light modulator includes an array of micromirrors that individually have two states—an ON state at which a small beam of light is transmitted to the projection optics—an OFF state in which the light reaching the micromirror is diverted into a light trap and does not reach the projection optics. The projection optics project and focus small beams of light received onto a build plane 56 (FIG. 5) that is above the transparent sheet 34. The build plane 56 is a thin (less than 0.1 millimeter (mm) thick) planar or parallelepiped region along which a new layer of hardened photocurable liquid 10 is accreted on to a lower face 20 of the build plate 18 or the 3D article 4 during fabrication of the 3D article 4. A lateral extent of the build plane 56 is defined by the lateral extent of radiation that can be applied by the light engine 22 during formation of a layer of the 3D article 4.

A frame 44 clamps a peripheral edge 46 of the transparent sheet 34. The frame 44 is mounted in a recess 48 formed into the vessel base 28. The vessel base 28 includes a tension ring or ridge 50 that stretches the transparent sheet 34.

Figure 5:
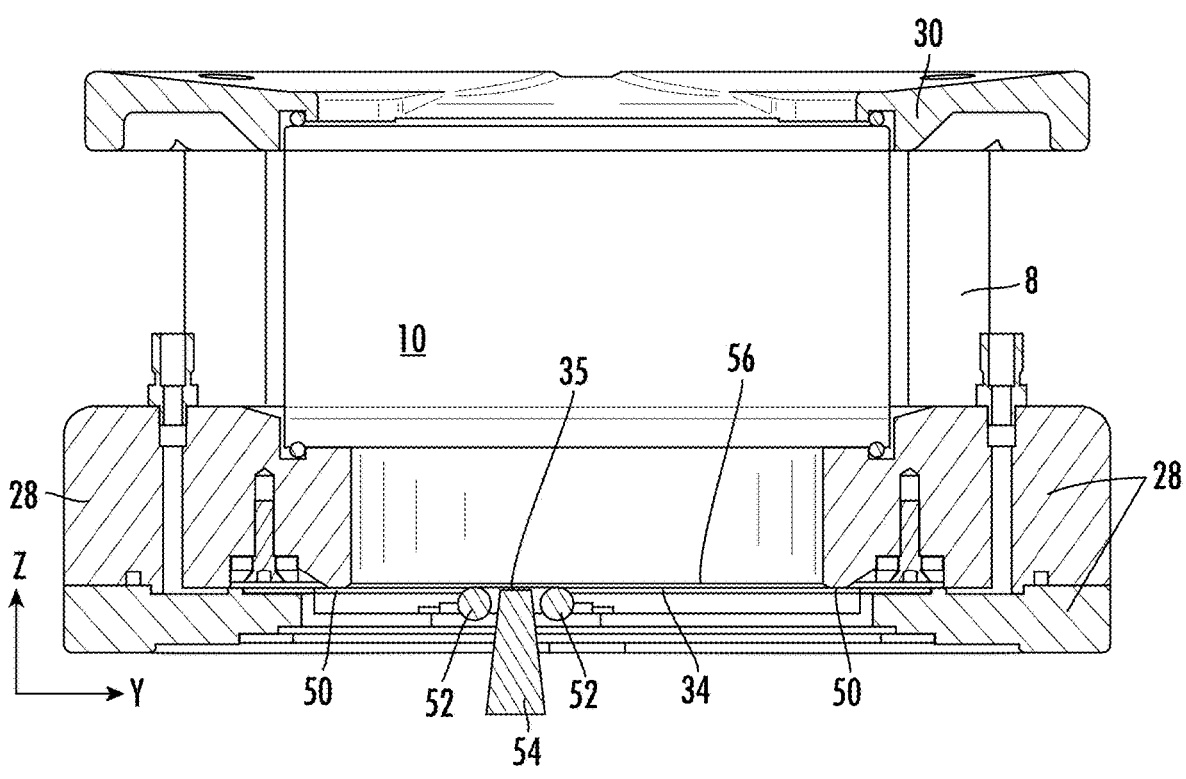
FIG. 5 is a sectional view of a first embodiment of a build vessel and certain portions of a vessel support.

FIG. 5 is a side sectional view of a first embodiment of the build vessel 8. The transparent sheet 34 is tensioned over the tension ring 50. Without further support, the transparent sheet 34 would tend to bulge downward, which would result in tolerance errors in forming layers of the 3D article 4. To reduce this error a pair of rollers 52 provide a localized vertical support for a supported portion 35 of the transparent sheet 34. In the first embodiment, the supported portion 35 is laterally between the pair of rollers 52. Shown in this sectional view is an optical path 54 from the projector 22 which is indicative of a radiation path from the projector 22 to a build plane 56 which is just above the transparent sheet 34. The projector 22 and the optical path 54 are configured to be positioned together along the lateral X axis during a selective application of radiation to a stripe or column of the build plane 56. Because of a limited distance between the two rollers 52, the bulge induced error is significantly reduced.

Figure 6:
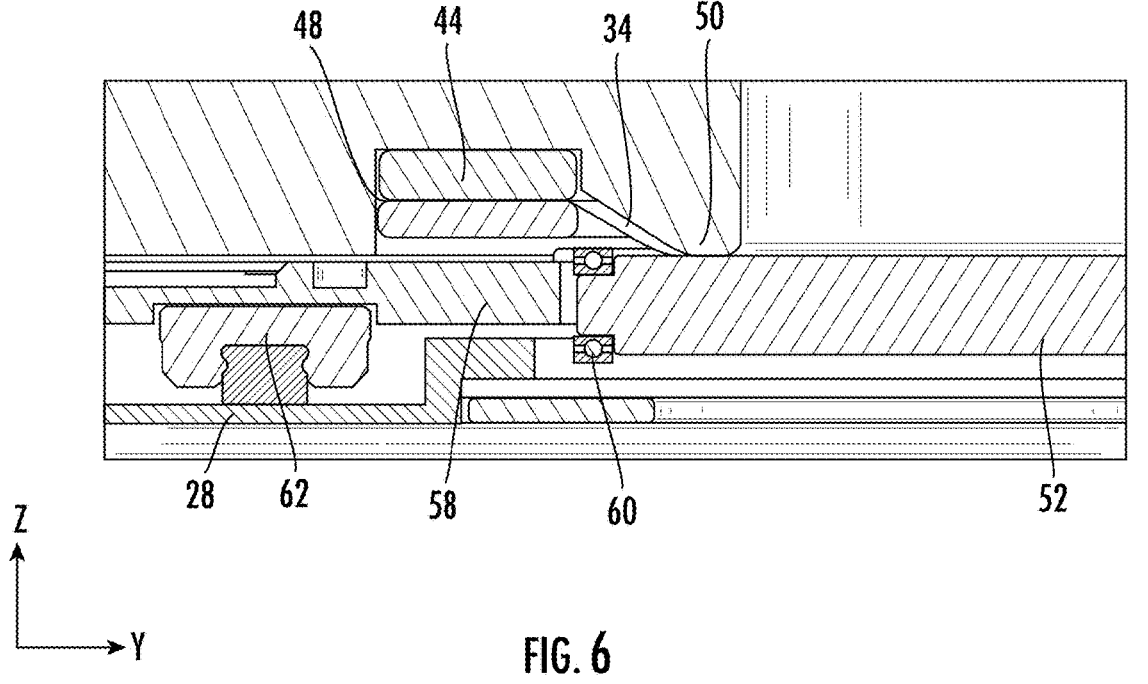
FIG. 6 is a side sectional view of a portion of the build vessel of FIG. 5, a vessel support, and a roller.

FIG. 6 is a side sectional view of a portion of the build vessel 8 including roller 52. Roller 52 has an axis of rotation along lateral axis Y. The roller 52 is mounted to the carriage 58 by a roller bearing 60. Roller bearing 60 includes a circular race of ball bearings to allow low friction rotation of the roller 52 about an axis of rotation parallel to the Y-axis. The carriage 58 is mounted to the vessel base 28 via a linear bearing 62. The carriage 58 can therefore translate along the lateral axis X and along the linear bearing 62 relative to the vessel base 28.

Figure 7:
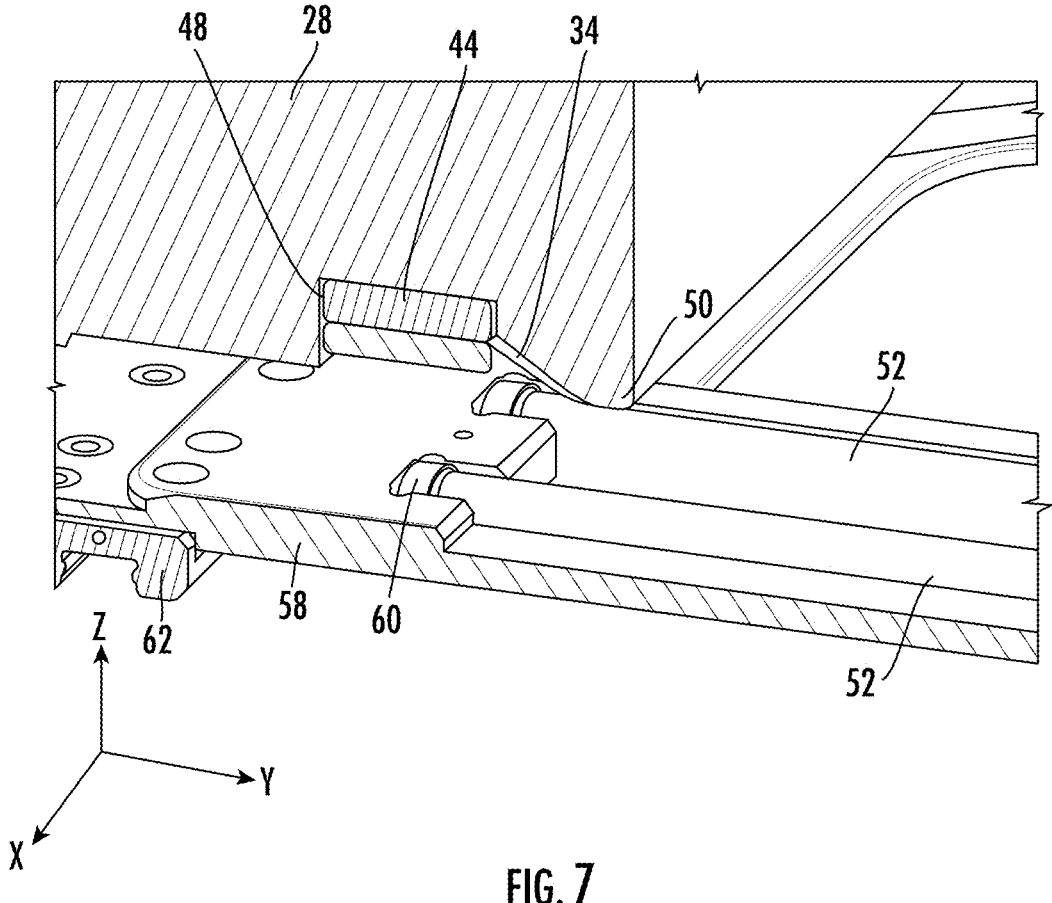
FIG. 7 is an isometric cutaway view of a portion of a build vessel and a carriage having two rollers.

The roller 52 is biased upward and presses upon the transparent sheet 34 and the tension ring 50. The transparent sheet 34 is "sandwiched" between the roller 52 and the tension ring 50. Thus, the bias of the roller 52 against the tension ring 50 controls a Z-height of the roller 52 to provide a very accurate vertical positioning of the transparent sheet 34 between the two rollers 52. The details illustrated in FIG. 7 are true for both ends of the roller 52. Thus, roller 52 extends between two opposing sides of the tension ring 50 and laterally spans build plane 56 along the lateral axis Y.

FIG. 7 is an isometric cutaway view of a portion of the build vessel 8, two rollers 52, and carriage 58. The carriage 58 is mounted to the vessel base 28 by two linear bearings 62 at opposed ends of vessel base 28 with respect to lateral axis Y. The carriage 58 and the projector 22 are configured to be positioned together along lateral axis X by the X-motor of the lateral movement mechanism 24. The rollers 52 are spring-biased or pressed against the transparent sheet 34 and tension ring 50 to maintain a consistent Z-height of transparent sheet 34 over the column or stripe that the projector 22 is selectively irradiating. The rollers 52 rotate about the roller bearings 60 as they translate with the carriage along X. The Y motor of the lateral movement mechanism 24 is configured to translate the projector 22 along the Y axis relative to the carriage 58.

Figure 8:
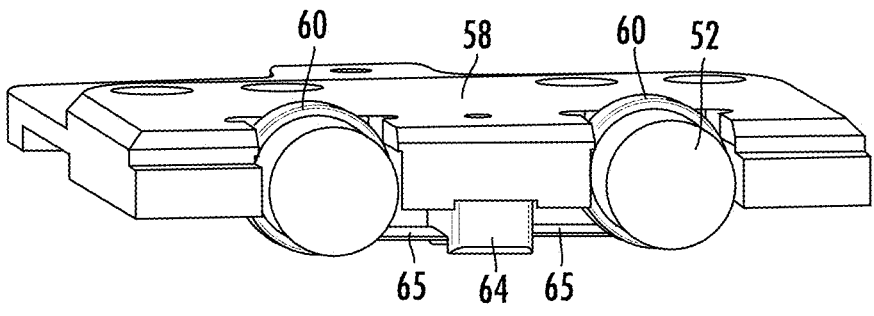
FIG. 8 is an isometric cutaway view of a carriage and two rollers.

FIG. 8 is an isometric cutaway view of the carriage 58, rollers 52 (cut off near carriage 58) and a spring bias mechanism 64 including leaf springs 65. Spring bias mechanism 64 is configured to apply an upward +Z spring force to the rollers 52 which in turn biases the rollers 52 against the transparent sheet 34 and tension ring 50.

In an illustrative embodiment, the rollers 52 have a surface having a lower hardness or scratch resistance than a lower surface of the transparent sheet 34. This will help prevent the rollers 52 from scratching the transparent sheet. In one embodiment, the rollers 52 are coated with a low hardness plastic or rubber material. In another embodiment, the rollers 52 can be coated with a thin machine oil that is transparent to blue to ultraviolet radiation. In yet other embodiments, the rollers 52 can be coated with an acrylic, a polyurethane, or silicone polymer. In a further embodiment, rollers 52 are coated with a felt material.

Figure 9:
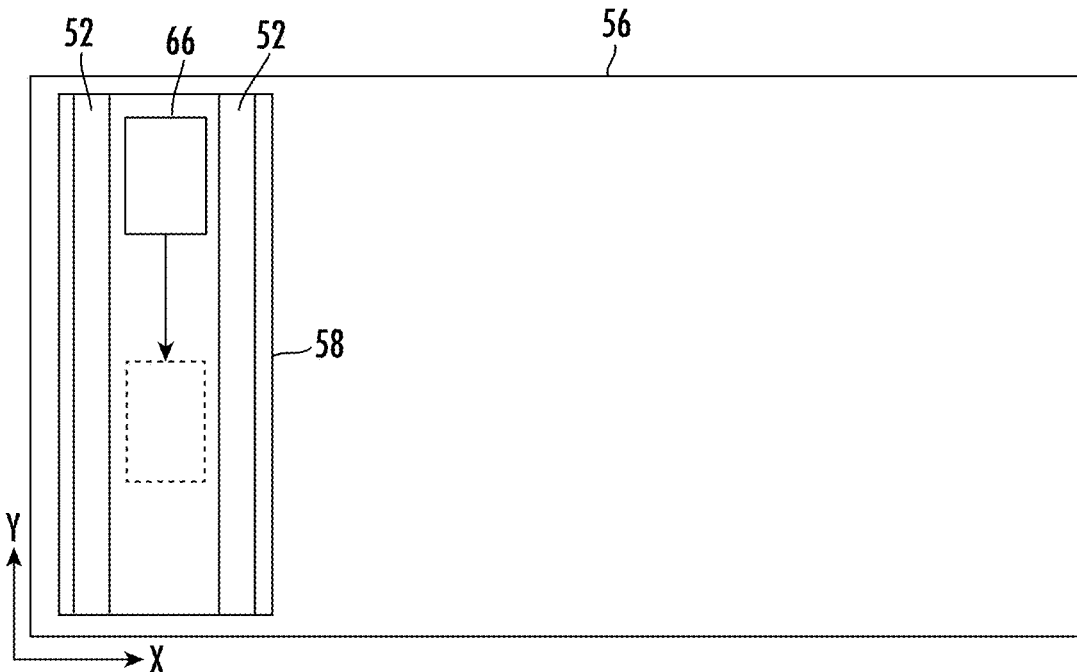
FIG. 9 is a schematic illustration of a build plane with a carriage in a first position.
Figure 10:
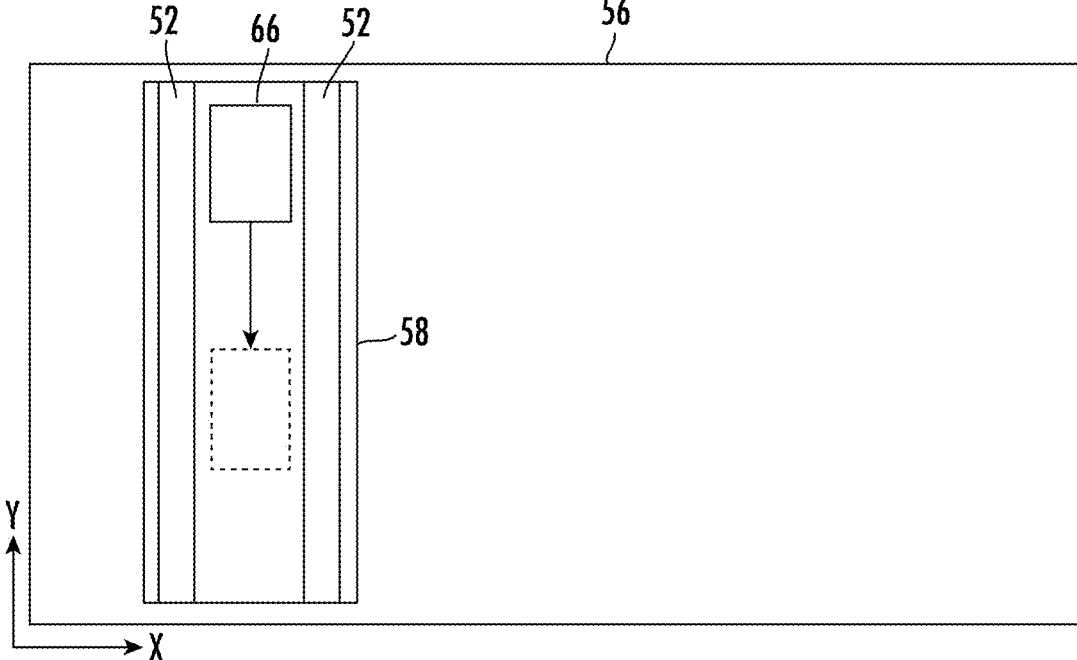
FIG. 10 is a schematic illustration of a build plane with a carriage in a second position.

FIGS. 9 and 10 are schematic illustrations that illustrate how the build plane 56 is selectively irradiated by the projector 22. In FIG. 9, the carriage 58 is positioned at a first location with respect to X. Projector 22 generates a pixelated rectangular pattern of radiation 66 upon the build plane 56. This has the effect of selectively curing the photocurable liquid 10 over that pixelated pattern 66. As the radiation is selectively applied, the Y-motor of lateral movement mechanism 24 scans the projector 22 and hence the pattern 66 along Y between rollers 52. Once the scanning is complete, the carriage 58 can be moved or stepped along the X-axis to a second location as illustrated in FIG. 10. Then scanning along the Y-axis and irradiation can proceed again. This step/scan method of selectively applying radiation is repeated until photocurable liquid 10 at build plane 56 has been selectively hardened as desired for a given layer of the 3D article 4.

Figure 11:
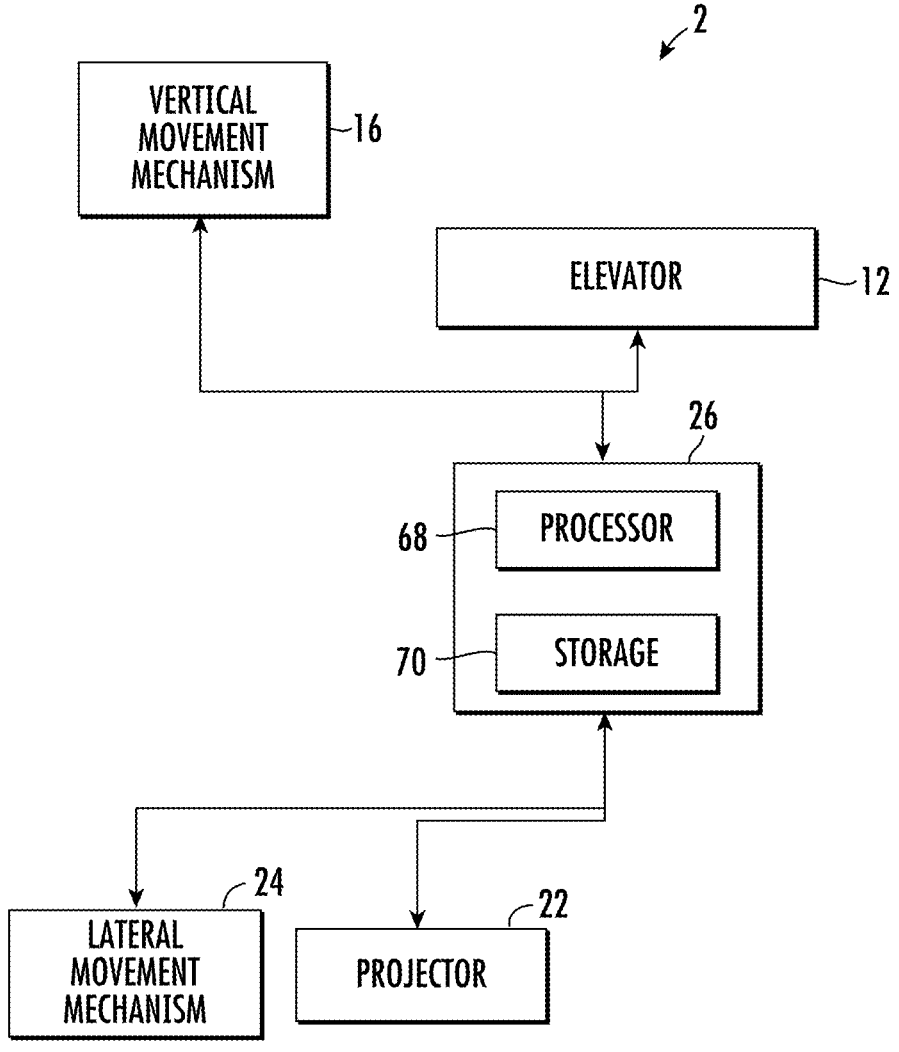
FIG. 11 is a simplified electrical block diagram of a 3D printing system.

FIG. 11 is a simplified electrical block diagram of 3D printing system 2. The controller 26 includes a processor 68 coupled to an information storage 70. The information storage 70 includes one or more non-transient or non-volatile storage devices that store software instructions. When executed by the processor 68, the software instructions, control portions of the 3D printing system 2 including the elevator 12, vertical movement mechanism 16, the projector 22, and the lateral movement mechanism 24.

Figure 12:
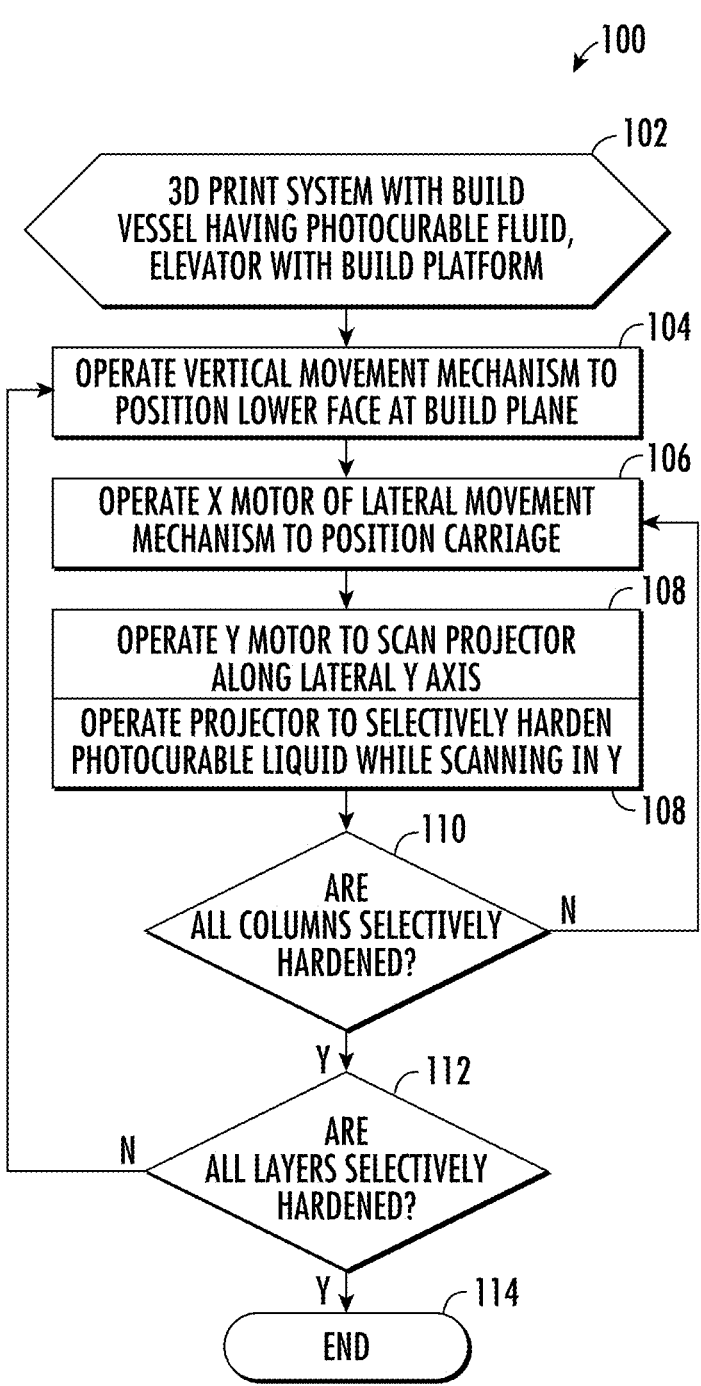
FIG. 12 is a flowchart depicting a method of manufacturing a 3D article.

FIG. 12 is a flowchart depicting a method 100 of manufacturing the 3D article 4. According to 102, the 3D printing system is ready for operating with a photocurable liquid 10 placed in the build vessel 8. According to 104, the vertical movement mechanism 16 is operated to position the lower face or surface 20 of build plate 18 (and later partially formed 3D article 4) at the build plane 56.

According to 106 the X motor of the lateral movement mechanism 24 is operated to position the carriage 58. According to 108, the Y motor of the lateral movement mechanism 24 is operated to scan the projector 22 (and hence the pixelated pattern 66) over between the rollers 52. Also according to 108, concurrent with the scanning, the projector 22 is operated to selectively irradiate of stripe or column of the build plane 56.

According to 110, a determination is made as to whether all columns of the build plane 56 have been selectively cured at a particular layer. If the answer is NO, then the process loops back to 106 to move to the next column. If the answer is YES, then the process moves to 112 to determine whether all layers of the 3D article have been selectively imaged. If the answer is NO, then the process loops back to 104 to move the lower face 20 to the build plane. If the answer is YES, then the method terminates according to 114.

Discussed supra, FIGS. 5-8 depict a first embodiment of the build vessel 8 in which a rectangular supported portion 35 of the transparent sheet 34 is vertically supported between a pair of rollers 58. FIGS. 13-16 are various views depicting a second embodiment of build vessel 8 which differs from the first embodiment in that the rectangular supported portion 35 is adjacent to a single roller 52. Whether the first embodiment (pair of rollers 52) or second embodiment (single roller 52) is used may depend on various factors including thickness, modulus, tension and other physical parameters of the transparent sheet 34. All other elements, features, and limitations of FIGS. 1-12 can otherwise apply in part or in whole to the second embodiment disclosed in FIGS. 13-15.

Figure 13:
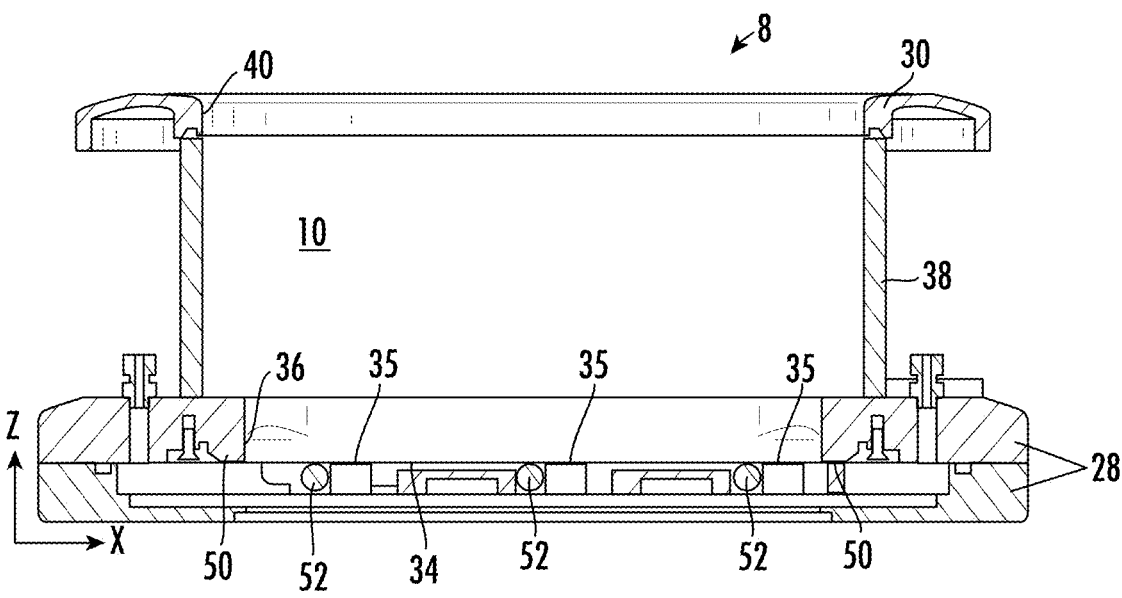
FIG. 13 is a sectional view of a second embodiment of a build vessel and certain portions of a vessel support.

FIG. 13 is a side sectional view of a second embodiment of the build vessel 8. In the illustrated second embodiment, there are three single rollers 52 that correspond to three different light projectors 22 that can scan along the X-axis. However, the second embodiment can also function with a single roller 52 and a single light projector 22.

Figure 14:
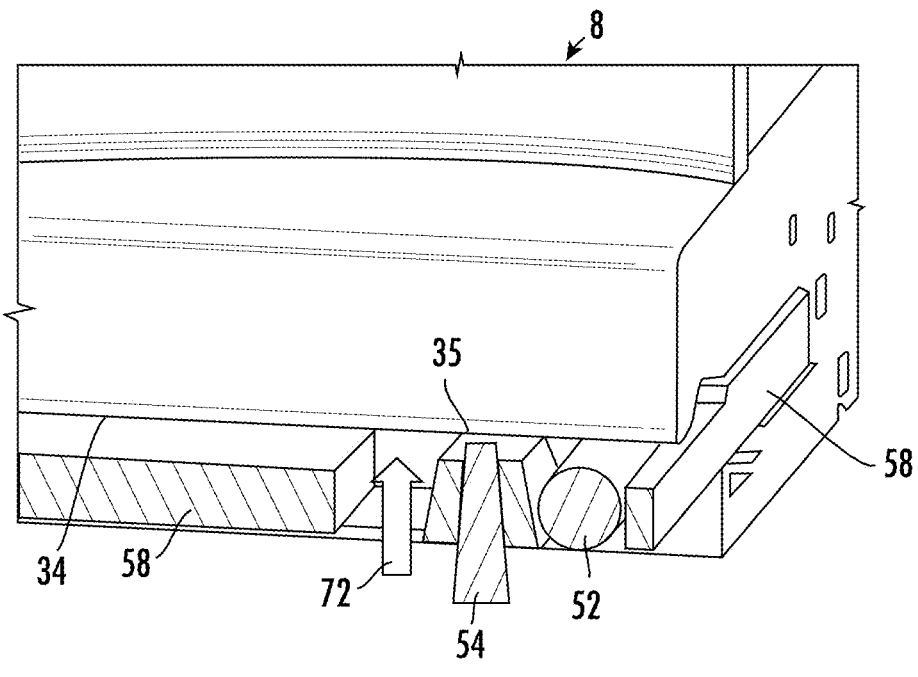
FIG. 14 is an isometric cutaway view of a portion of the build vessel of FIG. 13, a vessel support, and a roller.

FIG. 14 is an isometric cutaway view of a portion of the build vessel 8. As shown, the carriage 58 supports a single roller 52 that is adjacent to the rectangular supported portion 35 of the transparent sheet 34. The axis of roller 52 is along the axis Y which is parallel to a long axis of the supported portion 35. Given a stiffness of the transparent sheet 34, the single roller 52 can maintain sufficient horizontal planarity of the supported portion 35.

To further maintain the planarity and prevent the transparent sheet from separating from the printed part, the cavity inside of the vessel base 28 can be pressurized with gas. Element 72 depicts a direction of a force exerted by the gas upon a lower surface of the transparent sheet 34. Element 72 also depicts the applied gas 72. The pressurized gas at least partially counters the weight of the fluid above (photocurable liquid 10) and prevents sag of the transparent sheet 34 after the roller 52 has passed. The correct pressure will depend on the height of the fluid, the stiffness of the part being printed and other factors.

Figure 15:
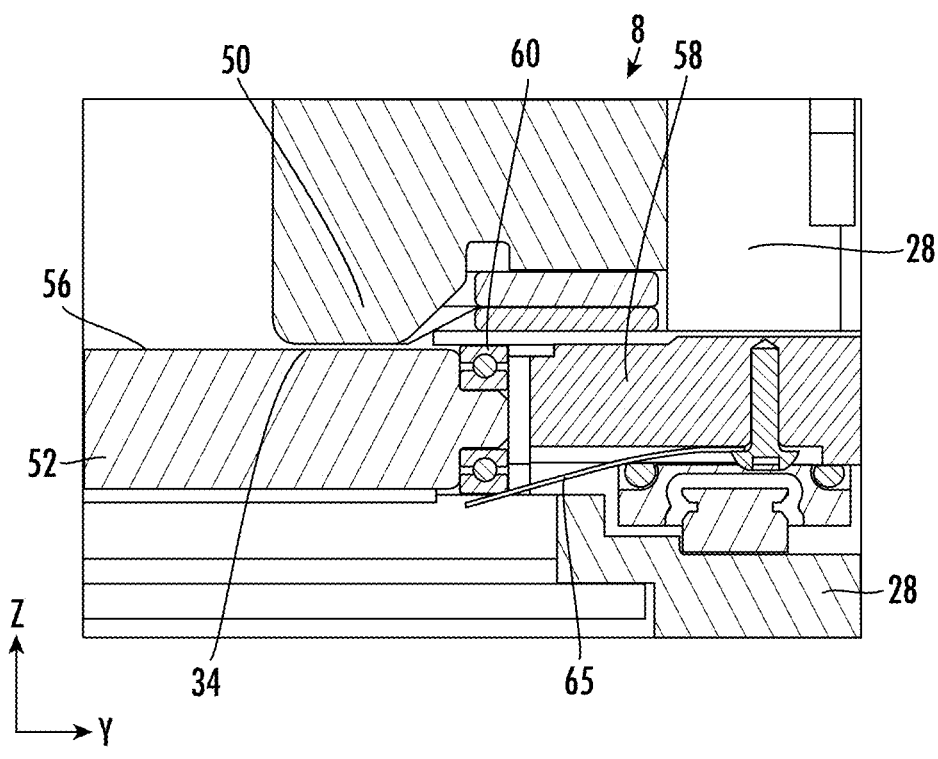
FIG. 15 is a side cross-sectional view of a portion of the build vessel of FIG. 13, a vessel support, and a roller.

FIG. 15 is a side sectional view of a portion of the build vessel 8. FIG. 15 is similar to FIG. 6. The primary implementation difference is in FIG. 15 carriage 58 supports a single roller 52 (as opposed to a pair of rollers 52). Otherwise, the description of FIG. 6 applies to FIG. 15. The roller 52 is biased or urged upward (+Z) by the leaf spring 65 and presses upon the tension ring 50. The transparent sheet 34 is "sandwiched" between the roller 52 and the tension ring 50. Roller 52 extends between two opposing sides of the tension ring 50 and therefore laterally spans the build plane 56 along the lateral axis Y.

Figure 16:
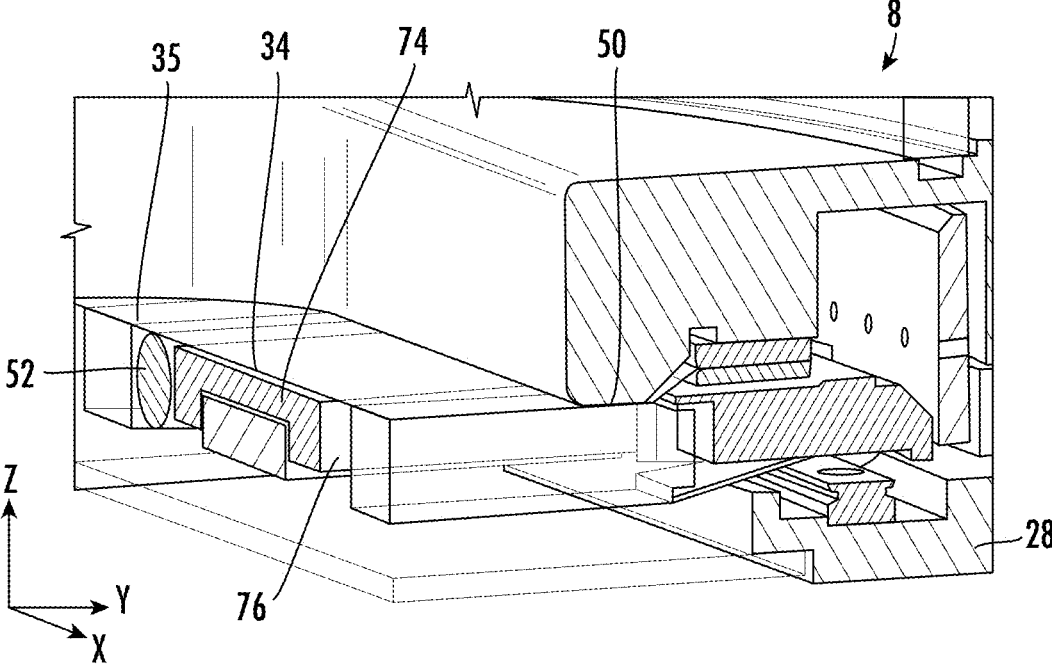
FIG. 16 is an isometric detail view of a portion of a build vessel including both roller and air support for a transparent sheet.

FIG. 16 is an isometric view of a portion of the build vessel 8. The supported portion 35 of the transparent sheet 34 is supported by roller 52. Additionally, a glass plate 74 is under the transparent sheet 34 for additional support and spans build plane 56. Like roller 52, the glass plate 74 also presses against the tension ring 50 (with transparent sheet 34 therebetween) as a vertical reference. Finally, a conduit 76 is configured to allow pressurized gas to contact a lower side of the transparent sheet 34. The gas pressure is applied to counteract the weight of the photocurable liquid 10 fluid column above the transparent sheet 34.

A source of the pressurized gas can be a gas cannister coupled to a pressure regulator. Alternatively, the source of the pressurized gas can be a gas pump such as a regenerative fan or bellows to name some examples. Fluid or gas pressure sources and pressure regulators are known in the art for 2D and 3D printing and for other industries and are used to maintain and regulate pressures of gas and fluid chambers.

Except for the use of two rollers 52 rather than one roller 52, much or all of the description presented supra with respect to FIGS. 1-12 can apply to the second embodiment described for FIGS. 13-15. Some of the earlier details from the first embodiment need not be repeated. Hence any or all variations described can be utilized with the first and second embodiments of the build vessel 8.

The specific embodiments and applications thereof described above are for illustrative purposes only and do not preclude modifications and variations encompassed by the scope of the following claims.

For example, a third embodiment can be envisioned. The two roller 52 support of FIGS. 5-8 can be utilized with the gas pressure 72. The gas pressure 72 will reach the lower side and supported portion 35 of the transparent sheet 34 through small openings within the carriage 58 and between attached components. The gas pressure at least partially offsets a downward pressure of the photocurable resin or bio-ink 10 so as to reduce a force required to support the transparent sheet 34 in the supported region 35 by roller or rollers 52. This improves flatness of supported region 35.

What is claimed:

1. A three-dimensional (3D) printing system configured to manufacture a 3D article, the 3D printing system comprising:

a machine chassis including a vessel support;

a build vessel supported by the vessel support, the build vessel including:

a vessel base having a downward extending tension ring; and a transparent sheet that is tensioned over the tension ring and laterally bounds a build plane defined along orthogonal lateral axes X and Y of the 3D printing system;

a carriage including a roller that extends laterally below two opposing sides of the tension ring, wherein the roller engages and exerts an upward force upon the two opposing sides of the tension ring with the transparent sheet between the roller and the tension ring, the upward force of the roller against the tension ring constrains a vertical location of and improves planarity of a portion of the transparent sheet adjacent to and supported by the roller; and a light engine configured to selectively apply radiation to a projected area of the build plane through the supported portion of the transparent sheet.

2. The 3D printing system of claim 1 wherein the vessel base defines a recess that extends around the tension ring and further comprises a support frame within the recess that clamps a peripheral edge of the transparent sheet.

3. The 3D printing system of claim 1 wherein the carriage is slidingly mounted to the vessel base by a pair of linear bearings to constrain motion of the carriage along the lateral axis X.

4. The 3D printing system of claim 3 further comprising a lateral movement mechanism configured to translate and position the carriage along the lateral axis X, the roller extending along the lateral axis Y.

5. The 3D printing system of claim 4 wherein the light engine is configured to be positioned together with the carriage along the lateral axis X.

6. The 3D printing system of claim 5 wherein the roller is one of two rollers of the carriage, the supported portion of the transparent sheet arranged between the two rollers.

7. The 3D printing system of claim 5 wherein the light engine is configured to translate relative to the carriage along the lateral axis Y.

8. The 3D printing system of claim 1 wherein the roller is coupled to the carriage at two ends thereof by a pair of circular bearings, the circular bearings biased upward to provide the upward force of the roller upon the tension ring.

9. The 3D printing system of claim 1 further comprising a source of pressurized gas configured to apply fluid pressure to a lower surface of the transparent sheet.

10. The 3D printing system of claim 1 wherein the light engine is configured to project a pixelated radiation field through the supported portion of the transparent sheet and to the build plane, and further comprising:

a lateral movement mechanism including:

an X motor configured to move the carriage along the lateral axis X; and a Y motor configured to move the light engine relative to the carriage along the lateral axis Y;

a build plate; and a vertical movement mechanism configured to vertically position the build plate.

11. The 3D printing system of claim 10 further comprising a controller configured to fabricate the 3D article through the sequential formation of individual layers of the 3D article, wherein for the individual layers the controller is further configured to:

operate the vertical movement mechanism to position a lower face of the build plate or the 3D article in a partially fabricated state at the build plane;

operate the X motor to sequentially position the carriage at a plurality of X-stop locations along the lateral axis X, for individual X stop locations;

operate the Y motor to scan the light engine along the lateral axis Y; and operate the light engine to selectively illuminate a column along the build plane as the light engine is being scanned.

12. A method of manufacturing the 3D article using the 3D printing system of claim 10, the method comprising:

operating the vertical movement mechanism to position a lower face of the build plate or the 3D article in a partially fabricated state at the build plane;

operating the X motor to sequentially position the carriage at a plurality of X-stop locations along the lateral axis X, for individual X-stop locations;

operating the Y motor to scan the light engine along the lateral axis Y; and operating the light engine to selectively illuminate a column along the build plane as the light engine is being scanned.

13. The 3D printing system of claim 1 wherein the roller has an outer surface that has a lower scratch resistance than a lower surface of the transparent sheet.

14. The 3D printing system of claim 1 wherein the roller includes a coating of a material selected from the group consisting of a polymer and an oil.

15. A three-dimensional (3D) printing system configured to manufacture a 3D article, the 3D printing system comprising:

a machine chassis including a vessel support;

a build vessel supported by the vessel support, the build vessel including:

a vessel base having a downward extending tension ring; and a transparent sheet that is tensioned over the tension ring and laterally bounds a build plane defined along orthogonal lateral axes X and Y of the 3D printing system;

a carriage mounted to the vessel base by a linear bearing, the carriage including a roller mounted to the carriage by a pair of roller bearings located at opposed ends of the roller, the carriage including a spring that biases the roller upward, wherein the roller spans the build plane and presses upon laterally opposed portions of the tension ring that are laterally outside of the build plane; and a light engine configured to selectively apply radiation to an area of the build plane adjacent to the roller.

16. The 3D printing system of claim 15 wherein the vessel base defines a recess that extends around the tension ring and further comprises a support frame within the recess that clamps a peripheral edge of the transparent sheet.

17. The 3D printing system of claim 15 further comprising a lateral movement mechanism coupled to the light engine and the carriage and configured to:

position the carriage and the light engine together along the lateral axis X; and position and translate the light engine relative to the carriage along the lateral axis Y.

18. The 3D printing system of claim 17 further including a vertical movement mechanism, a build plate, and a controller, the controller configured to:

operate the vertical movement mechanism to position a lower face of the build plate or the 3D article in a partially fabricated state at the build plane;

operate the lateral movement mechanism to position the carriage at a plurality of locations along the lateral axis X, wherein at individual ones of the plurality of adjacent locations the roller bounds a column of the build plane so that the plurality of adjacent locations of the build plane correspond to a plurality of adjacent columns, the adjacent columns contiguously covering a region of the build plane to be selectively irradiated, at a respective one of the columns;

operate the lateral movement mechanism to scan the light engine over the respective columns along the lateral axis Y; and operate the light engine to selectively irradiate the respective columns.

19. A method of manufacturing the 3D article using the 3D printing system of claim 18, the method comprising:

operating the vertical movement mechanism to position a lower face of the build plate or the 3D article in a partially fabricated state at the build plane;

operating the lateral movement mechanism to position the carriage at a plurality of locations along the lateral axis X;

operating the lateral movement mechanism to scan the light engine over the respective columns along the lateral axis Y; and operating the light engine to selectively irradiate the respective columns.

20. The three-dimensional (3D) printing system of claim 15 wherein the roller has an outer surface that has a lower scratch resistance than a lower surface of the transparent sheet, the outer surface formed from a material that is one or more of a polymer, an oil, and a felt material.

21. The three-dimensional (3D) printing system of claim 15 wherein the roller is one of two rollers of the carriage that support the transparent sheet therebetween.

22. The three-dimensional (3D) printing system of claim 15 further comprising a source of pressurized fluid configured to apply fluid pressure to a lower surface of the transparent sheet.

* * * * *